(12) United States Patent
Rozman et al.

(10) Patent No.: US 10,855,216 B2
(45) Date of Patent: Dec. 1, 2020

(54) VOLTAGE REGULATION OF MULTI-PHASE PERMANENT MAGNET GENERATOR

(71) Applicant: Hamilton Sundstrand Corporation, Charlotte, NC (US)

(72) Inventors: Gregory I. Rozman, Myrtle Beach, SC (US); Steven J. Moss, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/126,012

(22) Filed: Sep. 10, 2018

(65) Prior Publication Data

US 2020/0083830 A1    Mar. 12, 2020

(51) Int. Cl.
| | |
|---|---|
| H02P 11/00 | (2006.01) |
| H02P 9/00 | (2006.01) |
| H02P 9/30 | (2006.01) |
| B64D 41/00 | (2006.01) |
| H02M 7/06 | (2006.01) |
| H02M 1/44 | (2007.01) |

(52) U.S. Cl.
CPC .............. *H02P 9/305* (2013.01); *B64D 41/00* (2013.01); *H02M 7/06* (2013.01); *H02M 1/44* (2013.01)

(58) Field of Classification Search
CPC ........... H02P 9/305; H02M 7/06; B64D 41/00
See application file for complete search history.

(56) References Cited

U.S. PATENT DOCUMENTS

| | | |
|---|---|---|
| 1,039,668 A | 9/1912 | Franklin |
| 5,394,321 A | 2/1995 | McCleer et al. |
| 5,642,009 A | 6/1997 | McCleer et al. |
| 6,097,127 A | 8/2000 | Rivera |
| 6,340,851 B1 | 1/2002 | Rinaldi et al. |
| 7,227,273 B2 | 6/2007 | Othmad et al. |

(Continued)

FOREIGN PATENT DOCUMENTS

| | | |
|---|---|---|
| EP | 2665152 A2 | 11/2013 |
| EP | 3343747 A1 | 7/2018 |

(Continued)

OTHER PUBLICATIONS

GB Search Report for Application No. 1912386.8, dated Feb. 21, 2020. 3 pages.

(Continued)

*Primary Examiner* — Tulsidas C Patel
*Assistant Examiner* — Thomas K Quigley
(74) *Attorney, Agent, or Firm* — Cantor Colburn LLP

(57) ABSTRACT

An aircraft power generation unit to generate power provided to a load includes a permanent magnet generator (PMG) that includes first, second, third and fourth sets of windings, each of the winding sets including three windings and a control coil and a rectifier section that includes first through third six pulse rectifiers, a DC to DC to converter and a common local output bus. The unit also includes an output bus configured to be connected to the load and including a positive output bus rail and a negative output bus rail, wherein the negative output bus rail is connected to the negative output of the DC to DC converter and a controller that receives an input signal from at least one of the output sets and selectively couples the DC to DC converter and one or more of the first, second and third six-pulse rectifiers to the output bus.

20 Claims, 3 Drawing Sheets

(56) References Cited

U.S. PATENT DOCUMENTS

| | | |
|---|---|---|
| 7,274,547 B2 | 9/2007 | Al-Khayat et al. |
| 7,301,310 B2 | 11/2007 | Ganev et al. |
| 7,330,012 B2 | 2/2008 | Ahmad |
| 7,385,372 B2 | 6/2008 | Ahmad et al. |
| 7,408,327 B2 | 8/2008 | Shah et al. |
| 7,439,713 B2 | 10/2008 | Dooley |
| 7,479,757 B2 | 1/2009 | Ahmad |
| 7,710,081 B2 | 5/2010 | Saban et al. |
| 7,960,948 B2 | 6/2011 | Saban et al. |
| 8,148,867 B2 | 4/2012 | Gieras et al. |
| 8,432,137 B2 | 4/2013 | Rozman et al. |
| 8,816,650 B2 | 8/2014 | Rozman et al. |
| 8,836,293 B1 | 9/2014 | Rozman et al. |
| 8,885,372 B1 | 11/2014 | Nanut |
| 8,975,876 B2 | 3/2015 | Rozman et al. |
| 9,059,647 B2 | 6/2015 | Rozman et al. |
| 9,667,232 B2 | 5/2017 | Kuznetsov |
| 9,853,512 B2 | 12/2017 | Trainer et al. |
| 9,941,827 B2 | 4/2018 | Rozman et al. |
| 9,985,562 B1 | 5/2018 | Rozman et al. |
| 10,075,106 B2 | 9/2018 | Ozman et al. |
| 10,396,680 B1 | 8/2019 | Ozman et al. |
| 2005/0276020 A1 | 12/2005 | Ahmad |
| 2006/0001318 A1 | 1/2006 | Ahmad et al. |
| 2006/0001319 A1 | 1/2006 | Ahmad et al. |
| 2006/0001397 A1 | 1/2006 | Ahmad et al. |
| 2007/0008741 A1 | 1/2007 | Al-Khayat et al. |
| 2007/0182382 A1 | 8/2007 | Aoyama |
| 2008/0103632 A1 | 5/2008 | Saban et al. |
| 2009/0009146 A1 | 1/2009 | Rozman et al. |
| 2010/0244599 A1 | 9/2010 | Saban et al. |
| 2012/0120689 A1 | 5/2012 | Rozman et al. |
| 2012/0126758 A1 | 5/2012 | Fang et al. |
| 2013/0325366 A1 | 12/2013 | Rozman |
| 2014/0266077 A1 | 9/2014 | Rozman et al. |
| 2014/0266079 A1 | 9/2014 | Rozman et al. |
| 2015/0061606 A1 | 3/2015 | Pan et al. |
| 2015/0263526 A1 | 9/2015 | Kjaer |
| 2016/0001333 A1 | 1/2016 | Jones et al. |
| 2016/0233406 A1 | 8/2016 | Kurikuma et al. |
| 2017/0359009 A1 | 12/2017 | Rozman et al. |
| 2018/0131254 A1 | 5/2018 | Rozman et al. |
| 2018/0191229 A1 | 7/2018 | Rozman et al. |
| 2018/0198395 A1 | 7/2018 | Gieras |
| 2018/0287483 A1 | 10/2018 | Henrard |
| 2019/0081582 A1 | 3/2019 | Rozman et al. |
| 2019/0097546 A1 | 3/2019 | Rozman et al. |
| 2019/0097558 A1 | 3/2019 | Rozman et al. |
| 2020/0076340 A1 | 3/2020 | Rozman et al. |

FOREIGN PATENT DOCUMENTS

| | | |
|---|---|---|
| EP | 3343747 A1 | 7/2020 |
| GB | 2578362 | 5/2020 |

OTHER PUBLICATIONS

GB Search Report for Application No. 1912408.0, dated Feb. 21, 2020. 3 pages.

Search Report for GB1912978.2, dated Mar. 5, 2020, 3 pages.

VOLTAGE REGULATION OF MULTI-PHASE PERMANENT MAGNET GENERATOR

BACKGROUND

Exemplary embodiments pertain to the art of power generation and, in particular, regulating a direct current (DC) voltage generated by a permanent magnet generator.

A conventional DC power generating system utilizes a 3-phase variable-speed permanent magnet generator (PMG) and an active rectifier. PMG's offers high efficiency and high power density in comparison with a wound-field synchronous generator. However, the size of the conventional two-level six switch active rectifier requires large size passive components, such as dc link capacitor and output power quality filter.

To achieve a high power density, multilevel topologies, such as an unidirectional Vienna Rectifier or a bi-directional neutral diode clamped multilevel converter, have been considered to achieve low harmonic distortion with moderate switching frequency and reduced EMI emissions compared to a standard 2-level active rectifier/inverter. However, these topologies are complex and expensive.

BRIEF DESCRIPTION

Disclosed is an aircraft power generation unit to generate direct current (DC) power provided to a load. The unit is include a permanent magnet generator (PMG) that includes first, second, third and fourth sets of windings, each of the winding sets including three windings and a rectifier section. The rectifier section includes a first six-pulse rectifier connected to the first set of windings and having a first rectifier positive rail and first rectifier negative rail; a second six-pulse rectifier connected to the second set of windings and having a second rectifier positive rail and a second rectifier negative rail; a third six-pulse rectifier connected to the third set of windings and having a third rectifier positive rail and a third rectifier negative rail; a DC to DC converter having a positive output and a negative output; and a common local output bus. The unit also includes an output bus configured to be connected to the load and including a positive output bus rail and a negative output bus rail, wherein the negative output bus rail is connected to the negative output of the DC to DC converter and a controller that receives an input signal from at least one of the output sets and selectively couples the DC to DC converter and one or more of the first, second and third six-pulse rectifiers to the output bus positive rail to provide a constant voltage to the load, wherein the controller selectively couples the one or more of the first, second and third six-pulse rectifiers to the common local output bus based on a speed of the PMG.

In a unit of any prior embodiment, a duty cycle of the DC to DC converter is adjusted to set the constant voltage provided to the load.

In a unit of any prior embodiment, the speed of the PMG is determined based on a frequency of the input signal.

In a unit of any prior embodiment, the unit further comprises: a first switch coupled between the first rectifier positive rail and the common local output bus; a second switch coupled between the second rectifier positive rail and the common local output bus; a third switch coupled between the first rectifier positive rail and the common local output bus; a fourth switch coupled between the first rectifier negative rail and the first rectifier positive rail; and a fifth switch coupled between the second rectifier negative rail and the third rectifier positive rail.

In a unit of any prior embodiment, the unit further comprises: a battery coupled to an input of the DC to DC converter; wherein the PMG is a 9-phase PMG.

In a unit of any prior embodiment, the unit further comprises: a sixth switch coupled between the positive output bus rail and the positive output of the DC to DC converter; a seventh switch coupled between the common local output bus and the negative output bus rail; wherein the outputs of the first and second six pulse rectifiers charge the battery through the DC to DC converter when the sixth and seventh switches are closed.

In a unit of any prior embodiment, the positive output of the DC to DC converter is coupled to the third rectifier negative rail.

In a unit of any prior embodiment, the six pulse rectifiers are passive rectifiers.

In a unit of any prior embodiment, the first six-pulse rectifier forms a first DC voltage ($Vdc1$) between the first rectifier positive rail and the first rectifier negative rail from voltage received from the first set of windings; the second-six pulse rectifier forms a second DC voltage ($Vdc2$) between the second rectifier positive rail and the second rectifier negative rail from voltage received from the second set of windings; and $Vdc1$ is greater than $Vdc2$.

In a unit of any prior embodiment, the unit further comprises: a fourth six-pulse rectifier connected to the fourth set of windings and having a fourth rectifier positive rail and a fourth rectifier negative rail, wherein: the third six-pulse rectifier forms a third DC voltage ($Vdc3$) between the third rectifier positive rail and third rectifier negative rail from voltage received from the third set of windings; the fourth six-pulse rectifier forms a fourth DC voltage ($Vdc4$) between the fourth rectifier positive rail and fourth rectifier negative rail from voltage received from the fourth set of windings; and $Vdc2 > Vdc3 > Vdc4$.

In a unit of any prior embodiment, $Vdc1 = 2Vdc2 = 4Vdc3 = 2Vdc4$.

Also disclosed is a method of providing direct current (DC) power provided to a load, the method comprising: generating alternating current (AC) power with a permanent magnet generator (PMG) that includes first, second third and fourth sets of windings, each of the sets of winding including three windings; and converting the AC power produced by the PMG into a DC output, with a rectifier section that includes: a first six-pulse rectifier connected to the first set of windings and having a first rectifier positive rail and first rectifier negative rail; a second six-pulse rectifier connected to the second set of windings and having a second rectifier positive rail and a second rectifier negative rail; a third six-pulse rectifier connected to the third set of windings and having a third rectifier positive rail and a third rectifier negative rail; and a DC to DC converter connected across the fourth rectifier positive rail and the fourth rectifier negative rail; and a common local output bus. The method also includes: coupling the DC to DC converter to an output bus negative rail; and selectively coupling with a controller based on an input signal from at least one of the output sets one or more of the first, second and third six-pulse rectifiers to an output bus positive rail to provide a constant voltage to the load, wherein the controller selectively couples the one or more of the first, second and third six-pulse rectifiers to the common local output bus based on a speed of the PMG.

In a method of any prior embodiment, the method also includes adjusting a duty cycle of the DC to DC converter to set the constant voltage provided to the load.

In a method of any prior embodiment, wherein the speed of the PMG is determined based on a frequency of the input signal.

In a method of any prior embodiment, the rectifier section further includes: a first switch coupled between the first rectifier positive rail and the common local output bus; a second switch coupled between the second rectifier positive rail and the common local output bus; a third switch coupled between the first rectifier positive rail and the common local output bus; a fourth switch coupled between the fourth rectifier negative rail and the output bus negative rail; and a fifth switch coupled between the second rectifier negative rail and the third rectifier positive rail.

In a method of any prior embodiment, the PMG is a 9-phase PMG and the rectifier section further includes: a battery coupled to an input of the DC to DC converter; a sixth switch coupled between the positive output bus rail and the positive output of the DC to DC converter; a seventh switch coupled between the common local output bus and the negative output bus rail; wherein the outputs of the first and second six pulse rectifiers charge the battery through the DC to DC converter when the sixth and seventh switches are closed.

In a method of any prior embodiment, the positive output of the DC to DC converter is coupled to the third rectifier negative rail.

In a method of any prior embodiment, an output voltage of the first six-pulse rectifier is greater than an output voltage of the second six pulse rectifier, the output voltage of the second six-pulse rectifier is greater than an output voltage of the third six pulse rectifier and the output voltage of the third six pulse rectifier is greater than an output of the fourth six pulse rectifier.

In a method of any prior embodiment, the output voltage of the first six-pulse rectifier is about double the output voltage of the second six pulse rectifier.

In a method of any prior embodiment, the output voltage of the second six-pulse rectifier is about double the output voltage of the third six pulse rectifier and the output voltage of the third six pulse rectifier about double the output of the fourth six pulse rectifier.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Disclosed herein is a power generating system that integrates a multiphase (e.g, 12 or 9) PMG and a power converter into an affordable high power density alternator with a good power quality, reduced losses, and low torque pulsation. In contrast to prior systems that employ active rectifiers, the disclosed system in one embodiment utilizes passive rectifiers. The system also includes a boost DC to DC converter that can be used to alter the voltage provided to a load.

By employing the teachings herein wherein three or four passive rectifier are stacked so that the output voltages of them can be selectively added together, the output voltage can kept constant while the output of the PMG changes while still allowing for a minimum duty cycle on the DC to DC converter. This can be done by controlling one or more switches that selectively choose which single rectifier or combination of rectifiers will contribute to the power provided to the load.

Figure 1:
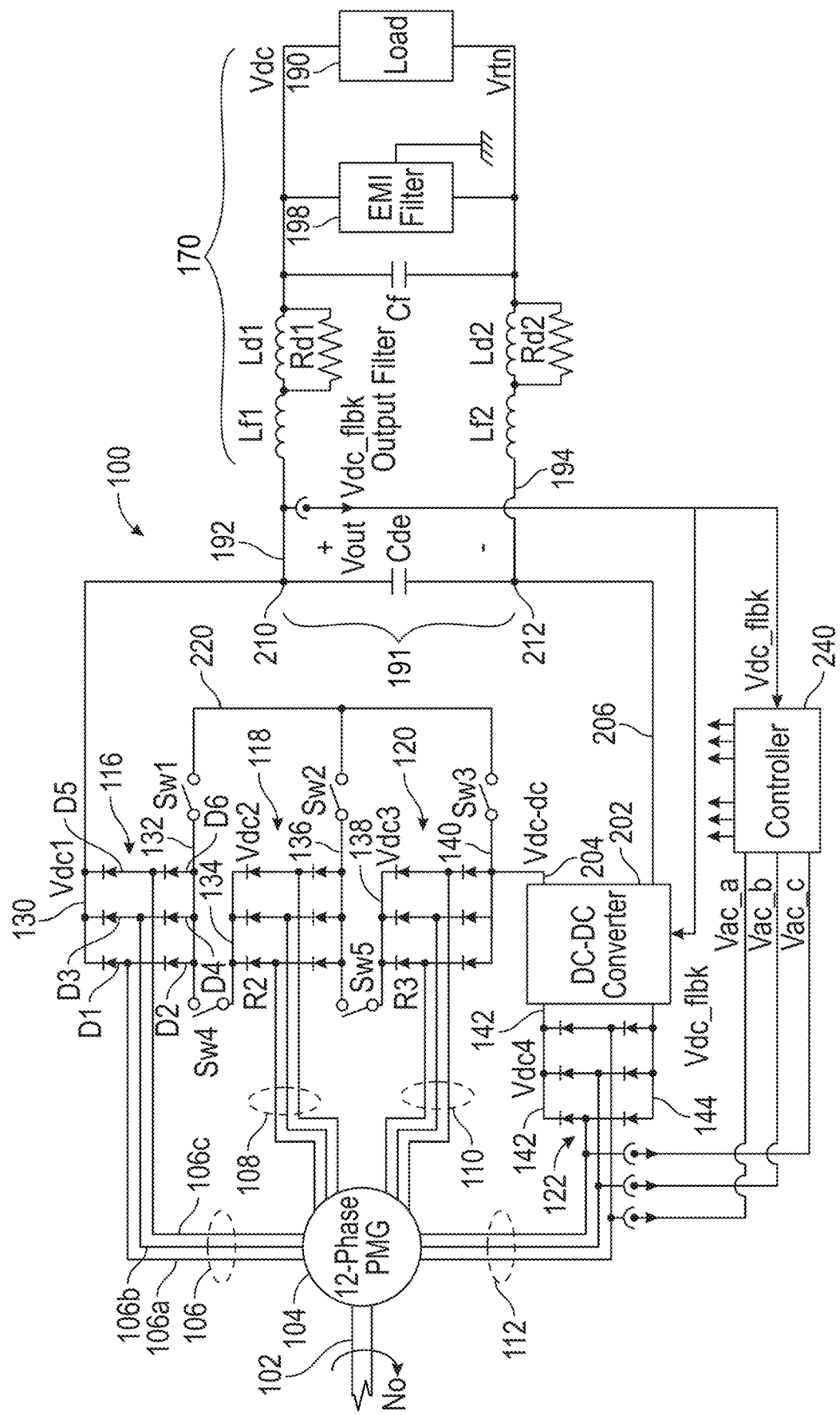
FIG. 1 is a schematic of a system that generates and delivers a regulated voltage to a load.

FIG. 1 is schematic of power generation system 100 according to one embodiment. The system can be part of aircraft or other vehicle and can receive rotational energy from a prime mover 102 such as a shaft connected to aircraft turbine, a RAM air turbine or an internal combustion engine.

The system 100 includes a 12-phase PMG 104. The PMG 104 includes four sets of three-phase windings. In FIG. 1, the PMG 104 provides three-phase outputs for each winding that are generally shown by winding outputs 106, 108, 110 and 112. In this example, the winding outputs 106 are shown as having three phases, 106a, 106b and 106c. The other winding outputs can also be three phase though not specifically referenced as such in FIG. 1.

Each set of winding outputs 106, 108, 110 and 112 is, respectively coupled to a six-pulse rectifier 116, 118, 120 and 122. The rectifiers are passive rectifiers in one embodiment. Each rectifier includes a positive rail and a negative rail. As illustrated, a first rectifier 116 includes positive rail 130 and negative rail 132, a second rectifier 118 includes positive rail 134 and a negative rail 136, a third rectifier 120 includes positive rail 138 and a negative rail 140 and a fourth rectifier 142 includes positive rail 142 and a negative rail 144. Each of the rectifier is formed in the same manner so only the first rectifier 130 is discussed in detail.

The first rectifier 116 includes D1 and D2 that serially connected between the positive and negative rails 130, 132 with output 106a connected between them. Similarly, D3 and D4 are serially connected between the positive and negative rails 130, 132 with output 106b connected between them and D5 and D6 are serially connected between the positive and negative rails 130, 132 with output 106c connected between them. In some cases, the negative rails referred to herein could also be referred to as return rails.

Based on the three phase input voltages received from the winding outputs 106a-106c, the first rectifier 116 produces a dc output voltage that this proportional to the magnitude of the signals on outputs 106a-106c. The voltage is measured between the positive and negative rails 130, 132 of the first rectifier 116 and is shown and referred to as Vdc1 herein.

Similarly, based on the three phase input voltages received from the windings outputs 108, the second rectifier 118 produces a dc output voltage that this proportional to the magnitude of the signals on outputs 108. The voltage is measured between the positive and negative rails 134, 136 of the second rectifier 118 and is shown and referred to as Vdc2 herein. Again, based on the three phase input voltages received from the windings outputs 110, the third rectifier 120 produces a substantially constant output voltage that this proportional to the magnitude of the signals on outputs 110. The voltage is measured between the positive and negative rails 138, 140 of the second rectifier 120 and is shown and referred to as Vdc3 herein. Lastly, based on the three phase input voltages received from the windings outputs 112, the fourth rectifier 122 produces a dc output voltage that this proportional to the magnitude of the signals on outputs 112. The voltage is measured between the positive and negative rails 142, 144 of the fourth rectifier 118 and is shown and referred to as Vdc4 herein.

Herein, the PMG 104 is arranged such that each set of winding outputs that is proportions to another set of windings. For example, the first set of winding outputs 106 can produce a "full" output, the second set of outputs 108 can produce a "½" output that has an amplitude that is ½ of that of the first set of outputs 106. Similarly, the third set of outputs 110 can produce a "¼" output that has an amplitude that is ¼th of that of the first set of outputs 106 and the fourth set of outputs 112 can produce a "½" output that has an amplitude that is ½ that of the first set of outputs 106. In such a case, Vdc1=2Vdc2=4Vdc3=2Vdc4.

The output Vdc4 of the fourth rectifier 122 is provided to a DC to DC converter 202 that, in one embodiment, is a boost converter that can step up the voltage from input to its output (shown as Vdc-dc). Vdc-dc voltage is automatically adjusted to maintain a substantially constant output voltage at the output dc bus 191 measured between the positive and negative rails of the DC bus 191. The particular values of Vdc1-Vdc4 and Vdc-dc can be varied based on the requirements as will be understood by the skilled artisan after reviewing this document. Further, as is known in the art, the duty cycle of the DC to DC converter can be determined based on input voltage Vdc4 to the dc-dc converter and required output voltage Vdc-dc of the dc-dc converter to maintain a substantially constant output voltage at the load.

The four rectifiers 116, 118, 120 and 122 and the DC to DC converter 202 collectively have an output Vout between nodes 210 and 212. Also provided are a series of switches that can be opened/closed to select one or more of the rectifiers 116, 118, 120 and 122 to connect to the output Vout. Vout is provided to output bus 191 in one embodiment.

To smooth voltage output at Vout (e.g., across output bus 191) an output capacitor Cdc can be provided across the output of the output voltage regulation section 160. This voltage can be directly provided to a load 190 in one embodiment. Optionally, an output filter 170 can be provided between Vout and the load 190.

The output filter 170 includes inductances LF1 and LD1 arranged serially along a positive rail 192 of the DC output bus 191, and inductances LF2 and LD2 arranged serially along the return rail 194 of the DC output bus 191. Resistances RD1 and RD2 may further be arranged on the DC output bus, in parallel communication with inductances LD1 and LD2, respectively. Furthermore, a filter capacitor CF may be arranged across the DC output bus 191. Also, an EMI filter 198 can also be arranged across the DC output bus 191.

As shown, five switches SW1-SW5 are provided that can select which rectifier(s) are coupled to the output bus 191. These switches include a first switch SW1 coupled between the negative rail 132 of the first rectifier and common local output bus 220, a second switch SW2 coupled between the negative rail 136 of the second rectifier and common local output bus 220 and a third switch SW3 coupled between the negative rail 140 of the third rectifier and common local output bus 220. As shown, a positive output 204 of the DC to DC converter 202 is connected to the negative rail 140 of the third rectifier 120 and the negative output of the DC to DC converter 206 is connected to the negative rail 194 of the output bus 191.

Based on the configuration of the switches SW1-SW5 different voltages can be provided to the output but 191. By altering the switch configuration, a constant or relatively constant voltage can be provided to the output bus regardless of generator speed. Several examples are provided below to make this point more clear.

Consider a situation where a voltage provided to the load (Vdc) of over about within 600 Vdc within 10% accuracy is desired. The PMG 104 could be configured such that Vdc1 is 400V, Vdc2 is 200V, Vdc3 is 100V and Vdc4 is 200V when the PMG 104 is operating at 20,000 rpm. Such output levels can be created by selecting the turns ratio of windings in the PMG 104. Is shall be understood, however that the exact 1, ½, ¼, ½ voltage ratio can be changed depending on the context.

The DC to DC converter 202 can provide a boost based on a duty cycle at which it operates. The duty cycle (D) can generally be set according to the relationship of D=1−Vin/Vout or, the case of the system 100 shown in FIG. 1, D=1−Vdc4/Vdc_dc. The value of D needed to achieve a particular Vout can be determined by the controller 240 based on the feedback voltage Vdc_fdbk.

To provide about 600 V to the load 190, switches SW1 and SW3 be closed and all other switches open with the duty cycle reduced to 0. In this manner, Vdc1 and only Vdc1 is provided o the output but 191. However, consider the case where the rpm of PMG is reduced to 18,000. In such a case, the rectifier output values will be lower and as follows: Vdc1 is 360V, Vdc2 is 180V, Vdc3 is 90V and Vdc4 is 180V. In such a case to ensure 600V is provided to the load, SW1, SW3 can the DC to DC converter 202 can be operated with a 0.25 duty cycle to produce 240V. This 240V and the 360V Vdc1 results in the production of a 600V Vout across the output bus 191. Similar switch modifications can be made based on motor speed (in RPM's) as shown in Table 1 below. In Table 1, Vpmg-r is the voltage between the positive rail 130 of the first rectifier 116 and the negative rail 120 of the third rectifier 120. Stated differently, Vpmg r is the voltage due to the combination of one or more rectifiers that is added to Vdc-dc to form Vout.

TABLE 1

| Speed, rpm | Vdc1 | Vdc2 | Vdc3 | Vdc4 | Sw1 | Sw2 | Sw3 | Sw4 | Sw5 | Vpmg-r | Vdc-dc | Duty Cycle |
|---|---|---|---|---|---|---|---|---|---|---|---|---|
| 20000 | 400 | 200 | 100 | 200 | Closed | Open | Closed | Open | Open | 400 | 200 | 0.00 |
| 18000 | 360 | 180 | 90 | 180 | Closed | Open | Closed | Open | Open | 360 | 240 | 0.25 |
| 16000 | 320 | 160 | 80 | 160 | Closed | Closed | Open | Open | Closed | 400 | 200 | 0.20 |
| 14000 | 280 | 140 | 70 | 140 | Open | Closed | Closed | Closed | Open | 420 | 180 | 0.22 |
| 12000 | 240 | 120 | 60 | 120 | Open | Open | Open | Closed | Closed | 420 | 180 | 0.33 |
| 10000 | 200 | 100 | 50 | 100 | Open | Open | Open | Closed | Closed | 350 | 250 | 0.60 |

The system also includes a controller 240. The controller 240 receives inputs Vac_a, Vac_b, and Vac_c from one of the sets of outputs. As shown, these signals are received from the fourth winding outputs 112 but any could suffice and only 1 phase may need to be example rather than the three. Based on the frequency of these inputs, rpm of the PMG can be determined. With reference to table 1, the controller can select the switch positions to achieve the desired output (e.g., greater than and within 10% of 600V). When needed (i.e., when the needed output is greater than any of the Vdc2 or Vdc3), the duty cycle of the DC to DC converter 202 can be set by the controller 240 so that the output remains at about 600. This can be achieved by consultation to table 1.

For completeness, to add the first and second rectifier voltages Vdc1 and Vdc2, switches SW2, SW3 and SW4 are closed. To add the first, second, and third rectifiers 116, 118 and 120, switches SW5, and SW4 are closed.

With reference again to FIG. 1, in another embodiment, a voltage sensor 196 that measures Vout and provide the measurement as a Vdc_fdbk signal to the controller. In one embodiment, Vdc_fdbk is used by the controller 240 to determine the configuration of the switches as well as the duty cycle of the DC to DC converter.

Figure 2:
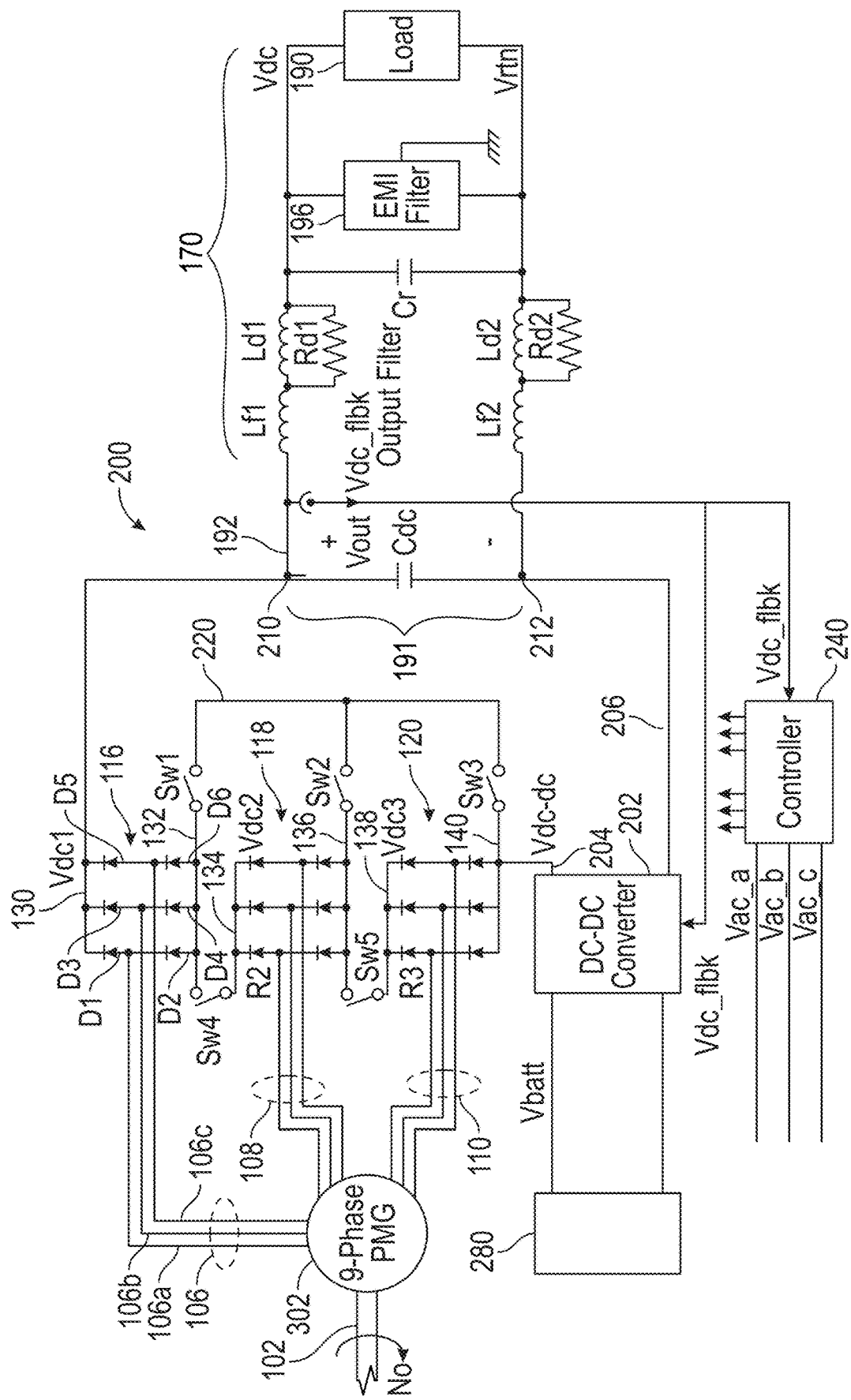
FIG. 2 is a schematic of a system that generates and delivers a regulated voltage to a load and includes a DC-DC to converter receives power from a battery.

With reference now to FIG. 2, in one embodiment a system 200 is provided that, rather than receiving power from the PMG 104, the DC to DC converter 202 can receiver power from a battery 280. In such a case, rather than the 12 phase PMG described above, a 9-phase PMG 302 can be provided.

The 9-phase PMG 302 includes three sets of three-phase windings. In FIG. 2, the PMG 302 provides three-phase outputs for each winding that are generally shown by winding outputs 106, 108, and 110. In this example, the winding outputs 106 are shown as having three phases, 106a, 106b and 106c. The other winding outputs can also be three phase though not specifically referenced as such in FIG. 2.

Each set of winding outputs 106, 108, and 110 is, respectively coupled to a six-pulse rectifier 116, 118, and 120. The rectifiers are passive rectifiers in one embodiment. Each rectifier includes a positive rail and a negative rail. As illustrated, a first rectifier 116 includes positive rail 130 and negative rail 132, a second rectifier 118 includes positive rail 134 and a negative rail 136, and a third rectifier 120 includes positive rail 138 and a negative rail 140. Each of the rectifier is formed in the same manner as described above.

Based on the three phase input voltages received from the winding outputs 106a-106c, the first rectifier 116 produces a dc output voltage that this proportional to the magnitude of the signals on outputs 106a-106c. The voltage is measured between the positive and negative rails 130, 132 of the first rectifier 116 and is shown and referred to as Vdc1 herein.

Similarly, based on the three phase input voltages received from the windings outputs 108, the second rectifier 118 produces a dc output voltage that this proportional to the magnitude of the signals on outputs 108. The voltage is measured between the positive and negative rails 134, 136 of the second rectifier 118 and is shown and referred to as Vdc2 herein. Again, based on the three phase input voltages received from the windings outputs 110, the third rectifier 120 produces a dc output voltage that this proportional to the magnitude of the signals on outputs 110. The voltage is measured between the positive and negative rails 138, 140 of the second rectifier 120 and is shown and referred to as Vdc3 herein.

Herein, the PMG 302 is arranged such that each set of winding outputs that is proportions to another set of windings. For example, the first set of winding outputs 106 can produce a "full" output, the second set of outputs 108 can produce a "½" output that has an amplitude that is ½ of that of the first set of outputs 106. Similarly, the third set of outputs 110 can produce a "¼" output that has an amplitude that is ¼th of that of the first set of outputs 106. In such a case, Vdc1=2Vdc2=4Vdc3.

The operation of the switches SW1-SW5 embodiment works in substantially same manner as described above.

Figure 3:
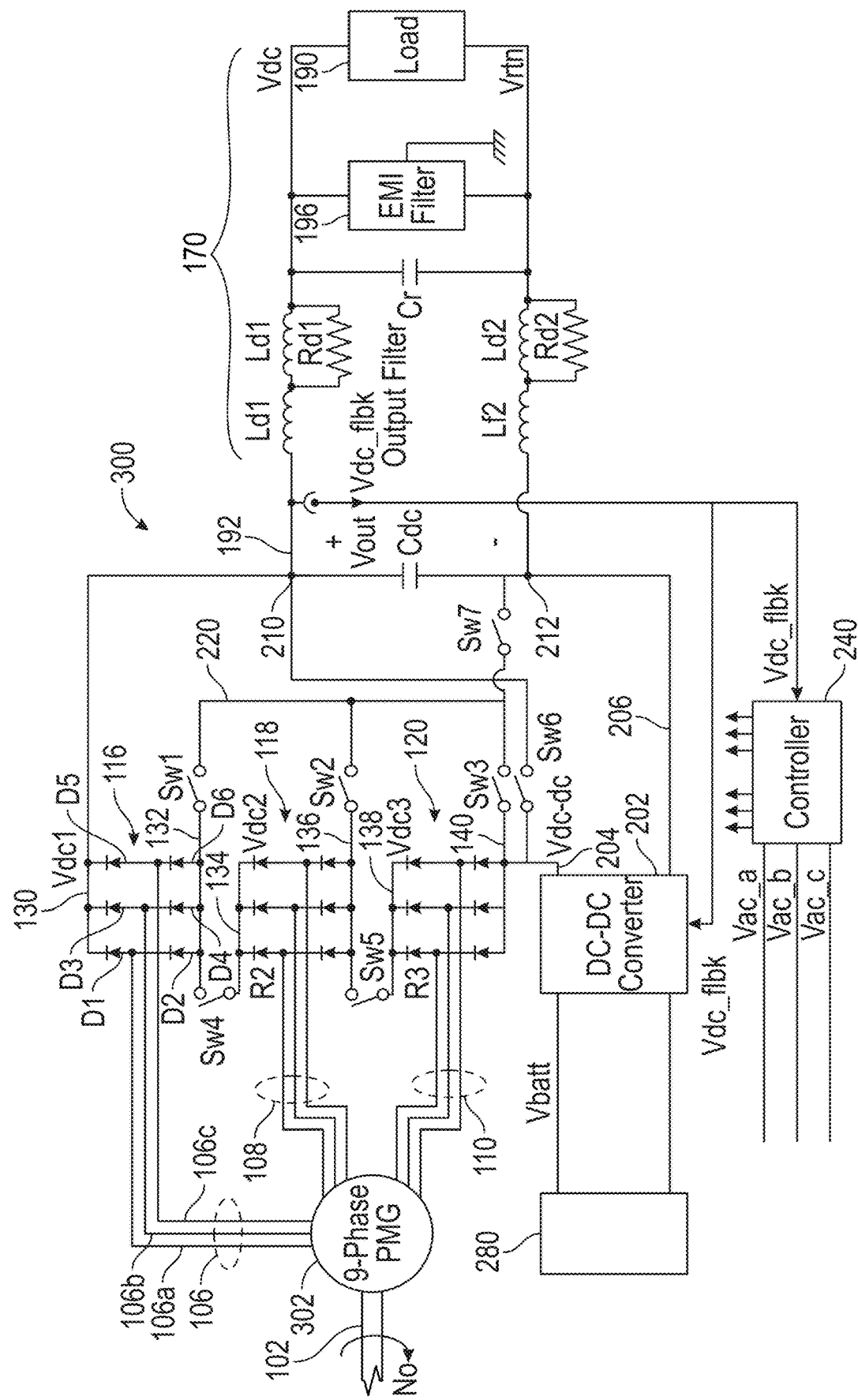
FIG. 3 is a schematic of a system that generates and delivers a regulated voltage to a load and includes a birectional DC-DC to converter receives power from and can charge a battery.

With reference now to FIG. 3, in one embodiment another system 200 is provided where the DC to DC converter 202 can be a bi-directional DC to DC converter. In such a case, the outputs of the first and second rectifiers 116, 118 will provide (at 20,000 rpm) 600 V to the output side of the DC to DC converter. This can be accomplished by adding 6th and 7th switches SW6, SW7 that, respectively, couple the positive rail 204 of the DC to DC converter 202 to the positive rail 192 (e.g. to Vdc1) and couple the negative rail 206 of the DC to DC converter 202 to the common local output bus 220. (e.g. to the negative rail 146 of the second rectifier 118. When switch SW4 and SW2 are also closed, Vdc1+Vdc2 (e.g., 600 V) is provided to the positive rail 204 of the bidirectional DC to DC converter 202 and can be used to charge the battery 280. The duty cycle of the DC to DC converter 202 is determined based on the charging current to the battery and can be approximately determined as shown in Table 2 where Vin in is the voltage created at the summed outputs of Vdc1 and Vdc2 (e.g, Vout). In the below, the duty cycle of the DC to DC converter is equal to Vbatt/Vdc_dc.

TABLE 2

Battery Charge Mode

| Speed, Rpm | Vdc1 | Vdc2 | Vdc3 | Vdc4 | Sw1 | Sw2 | Sw3 | Sw4 | Sw5 | Sw6 | Sw7 | Vin | Vdc-dc | Duty Cycle |
|---|---|---|---|---|---|---|---|---|---|---|---|---|---|---|
| 20000 | 400 | 200 | 100 | 28 | Open | Closed | Open | Closed | Open | Closed | Closed | 600 | 600 | 0.05 |
| 20000 | 400 | 200 | 90 | 120 | Open | Closed | Open | Closed | Open | Closed | Closed | 600 | 600 | 0.20 |

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft power generation unit to generate direct current (DC) power provided to a load, the unit comprising:
   a permanent magnet generator (PMG) that includes first, second, third and fourth sets of windings, each of the winding sets including three windings;
   a rectifier section that includes:
      a first six-pulse rectifier connected to the first set of windings and having a first rectifier positive rail and first rectifier negative rail;
      a second six-pulse rectifier connected to the second set of windings and having a second rectifier positive rail and a second rectifier negative rail;
      a third six-pulse rectifier connected to the third set of windings and having a third rectifier positive rail and a third rectifier negative rail;
      a DC to DC converter having a positive output and a negative output; and
      a common local output bus;
   an output bus configured to be connected to the load and including a positive output bus rail and a negative output bus rail, wherein the negative output bus rail is connected to the negative output of the DC to DC converter; and
   a controller that receives an input signal from at least one of the output sets and selectively couples the DC to DC converter and one or more of the first, second and third six-pulse rectifiers to the output bus positive rail to provide a constant voltage to the load, wherein the controller selectively couples the one or more of the first, second and third six-pulse rectifiers to the common local output bus based on a speed of the PMG.

2. The unit of claim 1, wherein a duty cycle of the DC to DC converter is adjusted to set the constant voltage provided to the load.

3. The unit of claim 1, wherein the speed of the PMG is determined based on a frequency of the input signal.

4. The unit of claim 1, further comprising:
   a first switch coupled between the first rectifier positive rail and the common local output bus;
   a second switch coupled between the second rectifier positive rail and the common local output bus;
   a third switch coupled between the first rectifier positive rail and the common local output bus;
   a fourth switch coupled between the first rectifier negative rail and the first rectifier positive rail; and
   a fifth switch coupled between the second rectifier negative rail and the third rectifier positive rail.

5. The unit of claim 4, further comprising:
   a battery coupled to an input of the DC to DC converter; wherein the PMG is a 9-phase PMG.

6. The unit of claim 5, further comprising:
   a sixth switch coupled between the positive output bus rail and the positive output of the DC to DC converter;
   a seventh switch coupled between the common local output bus and the negative output bus rail;
   wherein the outputs of the first and second six pulse rectifiers charge the battery through the DC to DC converter when the sixth and seventh switches are closed.

7. The unit of claim 1, wherein the positive output of the DC to DC converter is coupled to the third rectifier negative rail.

8. The unit of claim 1, wherein the six pulse rectifiers are passive rectifiers.

9. The unit of claim 1, wherein:
   the first six-pulse rectifier forms a first DC voltage (Vdc1) between the first rectifier positive rail and the first rectifier negative rail from voltage received from the first set of windings;
   the second-six pulse rectifier forms a second DC voltage (Vdc2) between the second rectifier positive rail and the second rectifier negative rail from voltage received from the second set of windings; and
   Vdc1 is greater than Vdc2.

10. The unit of claim 9, further comprising a fourth six-pulse rectifier connected to the fourth set of windings and having a fourth rectifier positive rail and a fourth rectifier negative rail,
   wherein:
   the third six-pulse rectifier forms a third DC voltage (Vdc3) between the third rectifier positive rail and third rectifier negative rail from voltage received from the third set of windings;
   the fourth six-pulse rectifier forms a fourth DC voltage (Vdc4) between the fourth rectifier positive rail and fourth rectifier negative rail from voltage received from the fourth set of windings; and Vdc2>Vdc3>Vdc4.

11. The unit of claim 10, wherein Vdc1=2Vdc2=4Vdc3=2Vdc4.

12. A method of providing direct current (DC) power provided to a load, the method comprising:
   generating alternating current (AC) power with a permanent magnet generator (PMG) that includes first, second third and fourth sets of windings, each of the sets of winding including three windings;
   converting the AC power produced by the PMG into a DC output, with a rectifier section that includes:
      a first six-pulse rectifier connected to the first set of windings and having a first rectifier positive rail and first rectifier negative rail;
      a second six-pulse rectifier connected to the second set of windings and having a second rectifier positive rail and a second rectifier negative rail;
      a third six-pulse rectifier connected to the third set of windings and having a third rectifier positive rail and a third rectifier negative rail;
      a fourth six-pulse rectifier connected to the fourth set of windings and having a fourth rectifier positive rail and a fourth rectifier negative rail;
      a DC to DC converter connected across the fourth rectifier positive rail and the fourth rectifier negative rail; and
      a common local output bus;
   coupling the DC to DC converter to an output bus negative rail; and
   selectively coupling with a controller based on an input signal from at least one of the output sets one or more of the first, second and third six-pulse rectifiers to an output bus positive rail to provide a constant voltage to the load, wherein the controller selectively couples the one or more of the first, second and third six-pulse rectifiers to the common local output bus based on a speed of the PMG.

13. The method claim 12, further comprising: adjusting a duty cycle of the DC to DC converter to set the constant voltage provided to the load.

14. The method of claim 12, wherein the speed of the PMG is determined based on a frequency of the input signal.

15. The method of claim 12, wherein the rectifier section further includes:
   a first switch coupled between the first rectifier positive rail and the common local output bus;
   a second switch coupled between the second rectifier positive rail and the common local output bus;
   a third switch coupled between the first rectifier positive rail and the common local output bus;
   a fourth switch coupled between the fourth rectifier negative rail and the output bus negative rail; and
   a fifth switch coupled between the second rectifier negative rail and the third rectifier positive rail.

16. The method of claim 15, wherein the PMG is a 9-phase PMG and the rectifier section further includes:
   a battery coupled to an input of the DC to DC converter;
   a sixth switch coupled between the positive output bus rail and the positive output of the DC to DC converter;
   a seventh switch coupled between the common local output bus and the negative output bus rail;
   wherein the outputs of the first and second six pulse rectifiers charge the battery through the DC to DC converter when the sixth and seventh switches are closed.

17. The method of claim 12, wherein the positive output of the DC to DC converter is coupled to the third rectifier negative rail.

18. The method of claim 12, wherein an output voltage of the first six-pulse rectifier is greater than an output voltage of the second six pulse rectifier, the output voltage of the second six-pulse rectifier is greater than an output voltage of the third six pulse rectifier and the output voltage of the third six pulse rectifier is greater than an output of the fourth six pulse rectifier.

19. The method of claim 18, wherein the output voltage of the first six-pulse rectifier is about double the output voltage of the second six pulse rectifier.

20. The method of claim 19, wherein the output voltage of the second six-pulse rectifier is about double the output voltage of the third six pulse rectifier and the output voltage of the third six pulse rectifier is about double the output of the fourth six pulse rectifier.

* * * * *